United States Patent [19]

Aschenbrouich et al.

[11] Patent Number: 5,235,565

[45] Date of Patent: Aug. 10, 1993

[54] TIME-ACCOUNTING SYSTEM AND METHOD COMPRISING MEANS FOR THE GENERATION OF CODES AT INSTANTS COMPUTED BY A SECRET ALGORITHM

[75] Inventors: Marc Aschenbrouich, Peyrolles en Provence; Francois Ilie; Alain Marechal, both of Paris, all of France

[73] Assignee: Hello S.A., Paris, France

[21] Appl. No.: 805,554

[22] Filed: Dec. 10, 1991

[30] Foreign Application Priority Data

Dec. 20, 1990 [FR] France ................... 90 16253

[51] Int. Cl.⁵ .................. G04F 1/00; G06K 15/00; G06F 15/30
[52] U.S. Cl. ..................... 368/90; 235/378; 364/464.01
[58] Field of Search ............... 368/90; 235/377–381, 235/384; 364/464; 194/900–902

[56] References Cited

U.S. PATENT DOCUMENTS

| | | | |
|---|---|---|---|
| 4,460,965 | 7/1984 | Trehn et al. | 364/464 |
| 4,717,815 | 1/1988 | Tomer | 368/90 |
| 4,730,285 | 3/1988 | Lie | 368/90 |
| 4,876,540 | 10/1989 | Berthon et al. | 368/90 |
| 5,003,520 | 3/1991 | Grieu et al. | 368/90 |

FOREIGN PATENT DOCUMENTS

| | | |
|---|---|---|
| 0034570 | 8/1981 | European Pat. Off. . |
| 0193635 | 9/1986 | European Pat. Off. . |
| 0402821 | 12/1990 | European Pat. Off. . |
| 88/09022 | 11/1988 | PCT Int'l Appl. . |
| 2158628 | 11/1985 | United Kingdom . |

Primary Examiner—Vit W. Miska
Attorney, Agent, or Firm—Merchant & Gould, Smith, Edell, Welter & Schmidt

[57] ABSTRACT

A device that can be used to check the authenticity of time-accounting systems and devices, and notably of time-accounting devices for reckoning periods of parking regulated by rules. The system is constituted by a plurality of boxes, each held by a distinct user, each box comprising computation means that determine at least two secret codes, the changing from one secret code to another being done substantially at one and the same instant for all of boxes and secret codes being identical for all of boxes substantially at the same instant to enable a checker to ascertain the authenticity of boxes, code-changing instant resulting from a secret computation.

13 Claims, 3 Drawing Sheets

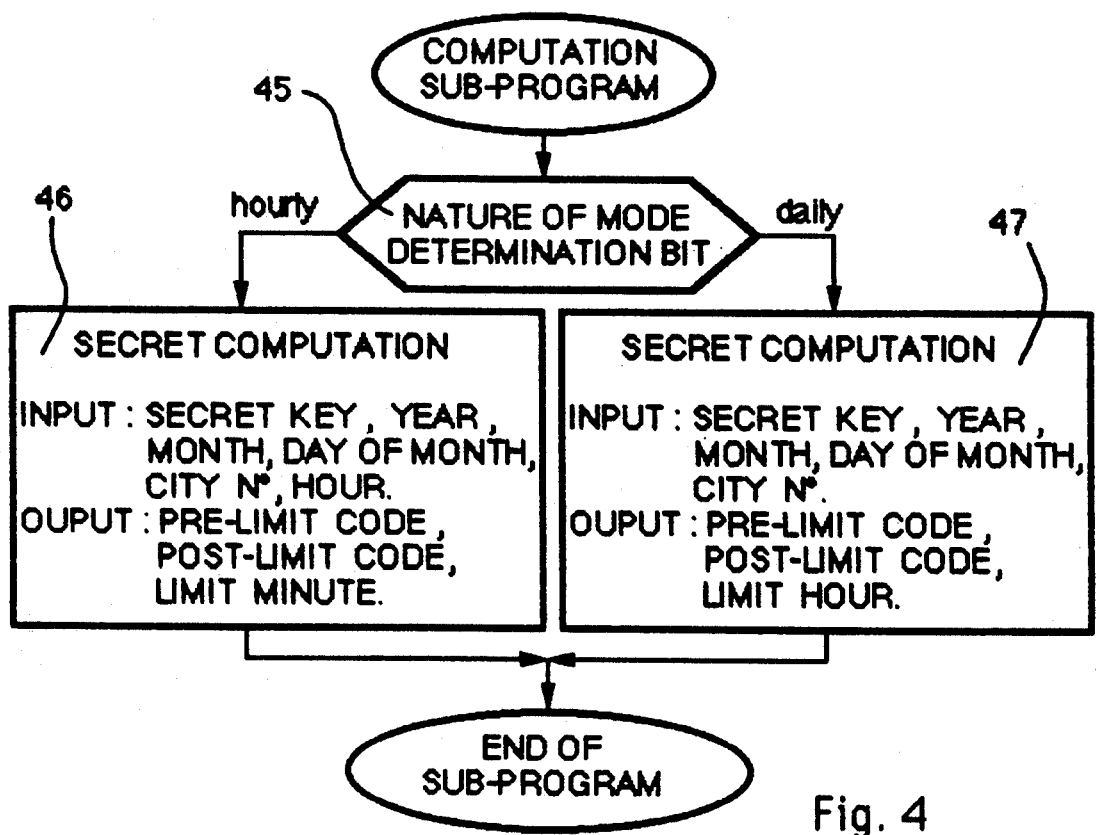
Fig. 4
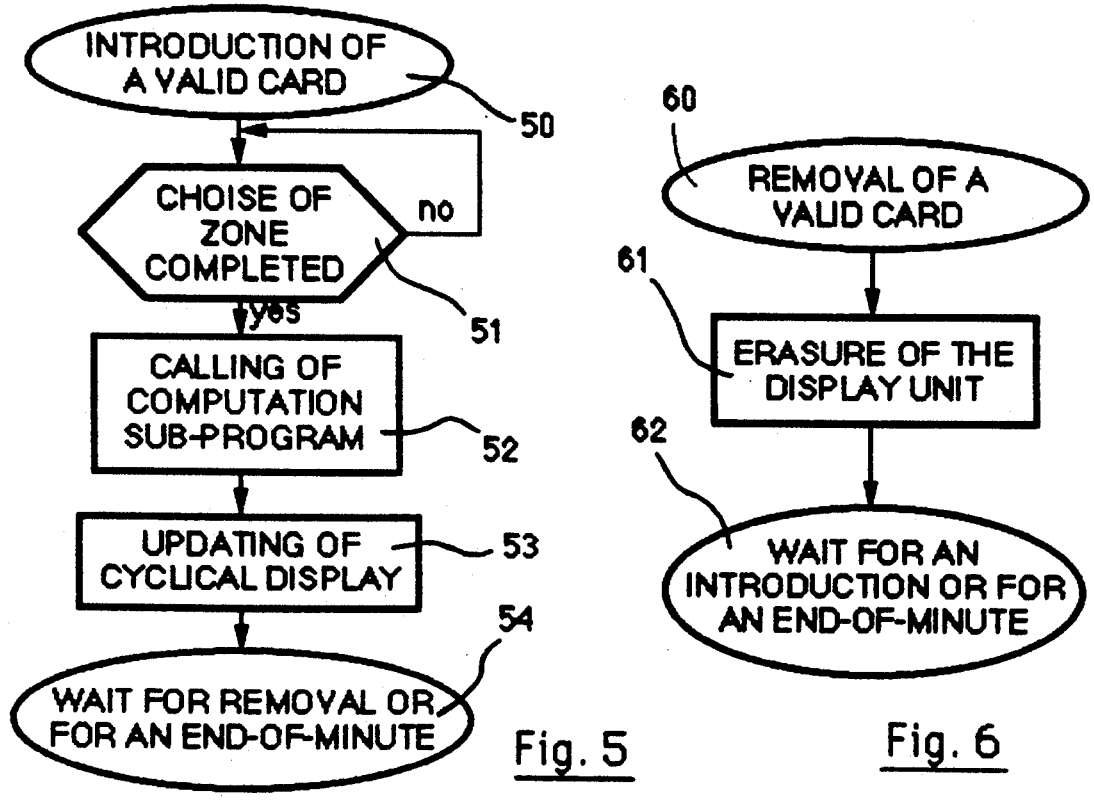
Fig. 5
Fig. 6

TIME-ACCOUNTING SYSTEM AND METHOD COMPRISING MEANS FOR THE GENERATION OF CODES AT INSTANTS COMPUTED BY A SECRET ALGORITHM

BACKGROUND OF THE INVENTION

1. Field of the Invention

The field of the invention is that of time-accounting systems and devices, and notably that of time-accounting devices for reckoning periods of parking regulated by rules.

More precisely, the present invention relates to a device that can be used to check the authenticity of a device of this type.

The term "time-accounting device" refers to an apparatus constituted, for example, by a box, preferably a portable one, that is designed to be placed behind the windscreen of a vehicle and works in cooperation with a prepaid electronic ticket, for example a memory card, to decrement fee units, memorized in the card, according to the parking time. This type of device can be used to eliminate the need for fixed individual posts (of the pavement parking meter type) or posts used in common by many vehicles (of the type installed at the entrance to parking lots). The user automatically pays the parking fees by introducing a prepaid memory card into his box. The boxes are generally sold, loaned or given out on hire by local authorities or their agents who sell parking units in the form of cards of a different type for each local authority. The validity of the parking can be verified by means of a display device on which there appear various elements of information needed by the checking staff, for example the number of the parking zone selected by the user, a code identifying notably the type of card introduced by the user into the box and representing the town or city in which the parking is being done and, as the case may be, an information element indicating a state of infringement of the rules, and the number of fee units still available in the card. The memories of the cards may be either rewritable or irreversibly written.

2. Description of the Prior Art

A device such as this is described, for example, in the French patent No. 87/06776 filed on behalf of the SOCIETE INTERNATIONAL POUR L'INNOVATION. The device described is a box comprising means to managing the changing of cards inserted into the box. It also includes means enabling the resetting of a clock internal to the box. This clock serves notably to make a regular count of the fee units and to take account of periods during the day when it is not necessary to pay for parking.

A major preoccupation over this type of device relates to the need to detect fraudulent individuals who might use boxes that have not been distributed by the rightful authorities. Indeed, fraudulent individuals may think of making boxes that have the same external appearance as authentic boxes but contain only a display unit cooperating with appropriate electronic circuitry to simulate a counting of fee units. It would then be impossible for a checker to detect the fraud without dismantling the spurious box.

An object of the present invention, notably, is to overcome this drawback of the prior art.

SUMMARY OF THE INVENTION

More precisely, the main aim of the invention is to provide a device that can be used to prevent the use of regulated parking time-accounting devices that are spurious versions of those distributed by a recognized authority, or least make such use of spurious devices very laborious and hence unprofitable.

A complementary aim of the invention is to provide a device such as this, that can be used to check the integrity both of the box and of the card inserted therein.

These aims, as well as others that shall appear hereinafter, are achieved by means of a time-accounting system, notably for the reckoning of regulated parking time, said system being constituted by a plurality of boxes, each held by a distinct user, each box comprising computation means that determine at least two secret codes, the changing from one secret code to another being done substantially at one and the same instant for all of said boxes and said secret codes being identical for all of said boxes substantially at the same instant to enable a checker to ascertain the authenticity of said boxes, said code-changing instant resulting from a secret computation.

Preferably, each of said boxes includes an independent integrated clock cooperating with said computing means to generate said codes at a given date and time. The presence of an internal clock such as this gives the device of the invention a character of independence.

According to a first embodiment, said computing means determine two codes for one and the same day, the passage from one code to the other being done once a day at an hour and a minute that result from a secret computation.

According to a second embodiment, said computing means determine two codes for each one-hour period, the changing from code to the other in the same one-hour period being done at a minute that results from a secret computation.

Advantageously, each box cooperates with an element containing consumable time units such as a memory card comprising an information element that determines the period of time in which the changing of the code has to take place. This information is modifiable, thus enabling the payment card distributor to easily modify the mode of operation of the boxes, for example in order to change from a daily mode (two codes per day) to an hourly mode (two codes per hour).

According to a preferred characteristic of the invention, said secret computation is done on the basis of at least one element of data coming from the box and at least one element of data coming from the element with consumable units.

In this way, the result of the computation is an optimized representation of the integrity of the two constituent elements of the portable parking meter (namely the box and the card), and is furthermore different each time for each type of card, and hence for each distinct area of parking validity.

Preferably, said codes result from a computation that makes use of at least one information element belonging to the group comprising the current hour, a secret key, the current date and a digital code characterizing the area of validity of the card inserted into the box.

Advantageously, said computation means generate said code-changing instant, one code preceding said code-changing instant and one code following said code-changing instant.

According to a preferred embodiment, said box comprises means notably to display the current hour, said current code and/or the parking commencement time. It is then easy to check whether the device is authentic or not. The display of the parking commencement time makes it possible to ascertain that the box+card system is truly authentic (and that the user is in order) in the case of parking zones with limited parking periods. It is also advantageously possible to provide for the display of the number of the parking zone selected by the user, when the system is initialized, to enable the checker to ascertain that the card introduced is being truly debited by the box in accordance with the rules for the zone in which the vehicle is parked.

Preferably, said box has means for being reset at the current time and time-lag means that systematically delay the display of the current code on said display means by several tens of seconds after a resetting at the current hour has been done, so as to discourage any attempt at fraud.

Advantageously, said current code appears on said display means in the form of a hexadecimal number encoded on two digits.

Preferably, said codes and said code-changing instant are computed automatically at the commencement of the parking by the introduction of said element with consumable time units into said box or else automatically at the beginning of the each hour. The computing means are then activated periodically, and the device does not require any means to memorize a plurality of codes.

The device also relates to a time-accounting box that forms part of a system as defined here above.

BRIEF DESCRIPTION OF THE DRAWINGS

Other features and advantages of the present invention shall appear from the following description of a preferred embodiment of the invention, given by way of a non-restrictive illustration, and from the appended drawings, of which:

FIGS. 3, 4, 5 and 6 are flow charts illustrating different aspects of a preferred mode of operation of the system for the generation and management of the secret codes according to the invention.

DETAILED DESCRIPTION OF THE INVENTION

Figure 1:
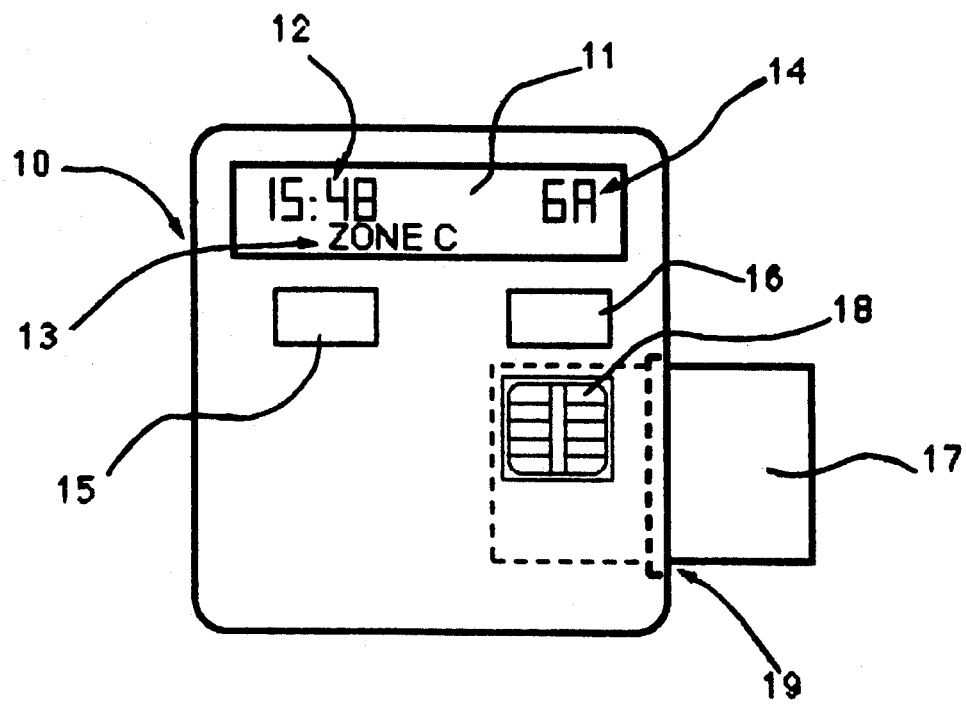
FIG. 1 shows a box according to the present invention, working in cooperation with a memory card.

FIG. 1 shows a box according to the present invention cooperating with a memory card.

A box 10 has a lateral slot 19 receiving a card 17 with microcircuit 18. The box 10 has display means 11, constituted for example by a liquid crystal display screen. The display means 11 may give a constant display or a cyclical scrolling display of the current time 12, the parking commencement time, the parking zone 13 for which the units presented on the card 17 are debited and a code 14 resulting from the secret computation according to the invention. The origin of this code 14 shall be given in detail here below. The box 10 also has two keys 15 and 16 that can be used notably to program the tariff zone 13 and to reset the current time in the box 10. The microcircuit 18 of the 17 communicates with the electronic circuitry of the box through reading/writing means that are not shown.

The secret code 14 appears on the display means 11 to enable a checker to ascertain the authenticity of the box 10. The secret code 14 has the characteristic of being updated at least once a day, at a time unknown to the user. Furthermore, this updating is done almost simultaneously in all the other boxes, the degree of simultaneity depending on the variable extent to which their integrated clocks are set to the exact time. Thus, if a fraudulent individual were to seek to create a spurious copy of the external appearance of the box 10 in order to integrate electronic circuitry therein capable of displaying a parking time limit on a display unit 11 without paying his parking fees (for example by placing a real payment card 17 in relation with the box, in the same way as is done with genuine boxes), he would also have to be almost constantly beside his vehicle to be able to display the new code, using any means (such as a keyboard on the back of the box) as soon as he has gain knowledge of this new code, which he can do notably by looking at the codes displayed on the genuine boxes placed in the other vehicles. This constraint therefore does not permit this fraudulent person to go very far away from his vehicle since he would then risks penalties not only for non-payment for his parking but also for his counterfeiting activities.

Figure 2A:
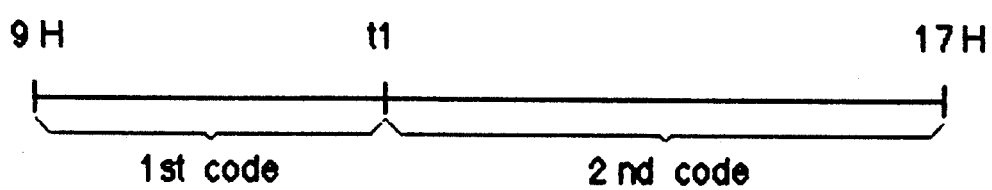
FIGS. 2A and 2B respectively show a first and second mode of operation of the invention, the first mode consisting in changing a code once in one and the same day, and the second mode consisting in changing a code twice in each whole hour of a day.
Figure 2B:
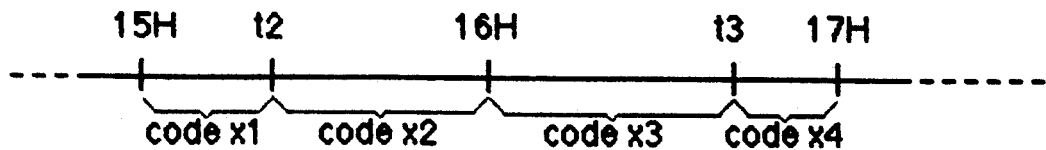

FIGS. 2A and 2B show two modes of operation of the invention, the first mode consisting in making only one change of code on one and the same day and the second mode consisting in making two changes of code for each one-hour period of a day.

The device of the invention can work in two modes:

the device of the invention generates two secret codes per day, the second code replacing the first one at a precise instant of the day, resulting from a secret computation;

the device generates two secret codes for each one-hour period of the day, the passage from one secret code to the other being done at a precise minute resulting from a secret computation. This mode of operation has increased security since the secret code is modified several times a day.

The first mode of operation is shown in FIG. 2A. The parking period fixed by the rules starts, for example, at 9 a.m. and ends at 5 p.m. According to one embodiment of the invention, the first code is displayed after the insertion of the portable element 17 into the box 10. In the course of the day, at an instant $t_1$ resulting from a secret computation, the first secret code is replaced by a second secret code which will be displayed until the end of the paid parking period as laid down by the rules. Naturally, if the user inserts his card after the code-changing time, it is the second code that will be displayed directly. The instant $t_1$ is preferably chosen to be precisely on the hour, but it may also correspond to a certain hour followed by a certain number of minutes, the accounting time unit being one minute.

The second mode of operation is shown in FIG. 2B. This mode of operation consists in changing the secret code twice an hour, for example a first time precisely on the hour and a second time at an instant within the corresponding one-hour period. Thus, in FIG. 2B, at 3 p.m., the code becomes $x_1$ and remains unchanged until the instant $t_2$ when a new code $x_2$ replaces the code $x_1$, $t_2$ resulting from a secret computation and being between 3 p.m. and 4 p.m. The code $x_2$ then remains displayed on the display means until the precise instant when the next hour strikes, i.e. until 4 p.m. At 4 p.m., a secret code $x_3$ replaces the code $x_2$ until an instant $t_3$ when a code $x_4$ replaces the code $x_3$. Since the paid parking time according to the rules ends at 5 p.m., the code $x_4$ may either remain displayed until the next morning when a new code will replace it, or simply disappear from the display.

FIGS. 3, 4, 5 and 6 are flow charts illustrating different aspects of a preferred mode of operation of the system for generating and managing secret codes according to the invention.

Figure 3:
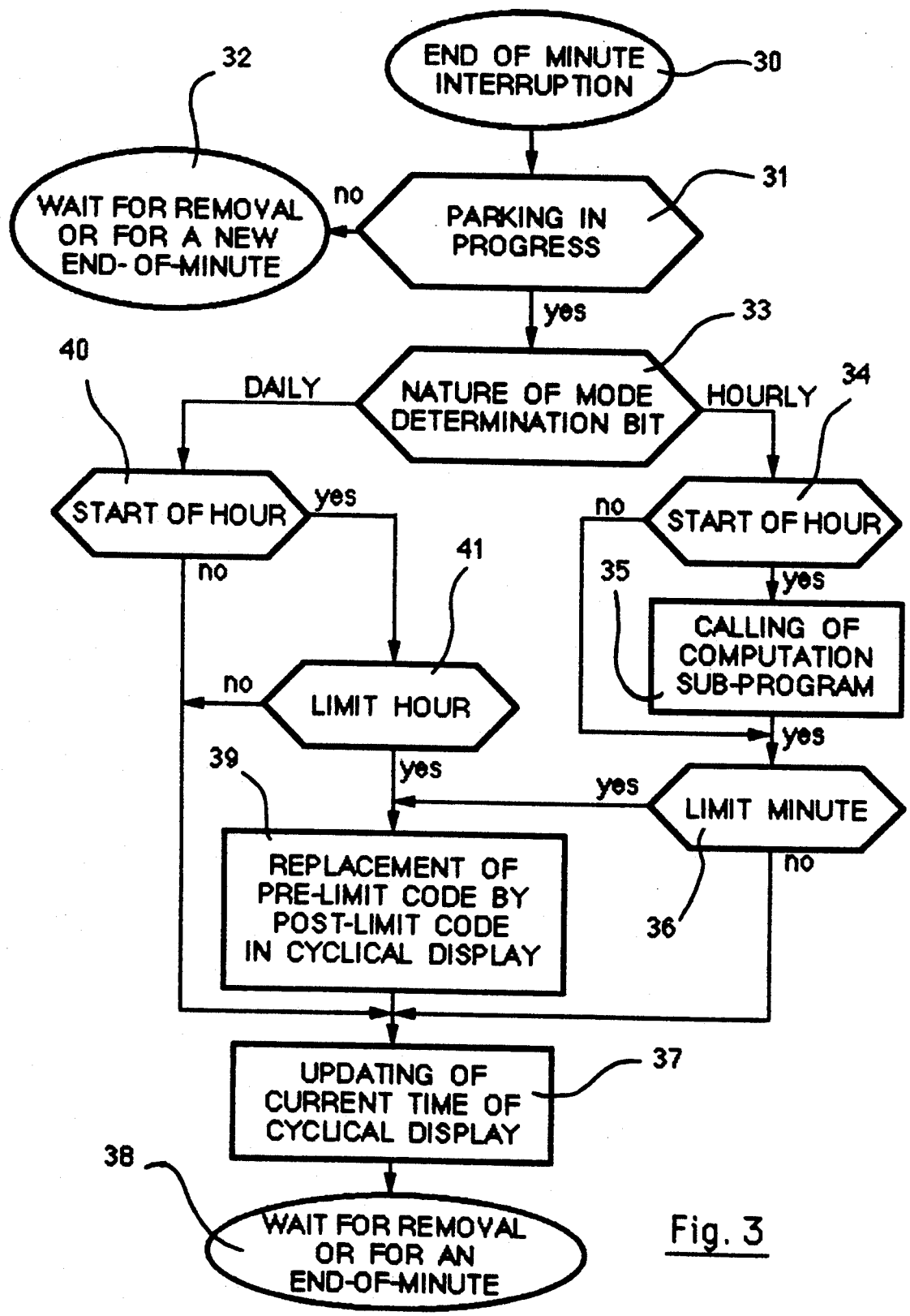

FIG. 3 illustrates the sequence of the operations performed by the central unit of the system, preferably every minute.

At each end-of-minute interruption, the system checks whether a parking is in progress (31). If not (32), the apparatus becomes dormant until the next end-of-minute interruption (30). The end-of-minute interruptions are systematic once a card has been introduced into the box.

Should there be a parking in progress, the system then carries out a test (33) on the nature of the code determination bit, i.e. whether the system works in hourly mode or in daily mode.

In the event of an operation in hourly mode (for example if the value of the bit=1), the system first carries out a test to find out whether it is at the start of an one-hour period (34), for example 3 p.m. If this is the case, the system will proceed to a new computation 35 of the two codes valid for the new one-hour period, as well as the "limit minute" for changing from the first code to the second code (see FIG. 4).

The system then carries out a new test 36 to find out whether it is at the code-changing "limit minute". If it is not at this position, the system simply updates (37) the value of the current time in the cyclical scrolling display of the box, and goes into a dormant state 38 pending a new interruption, either for the end of a minute or for the withdrawal of the card.

By contrast, if the "limit minute" test 36 is positive, the second code (post-limit code) of the one-hour period in progress replaces (39) the first code (pre-limit code) in the cyclical display of the box. The system then carries out the step 37 for updating the current time and the step 38 for going into the dormant state.

Should the operating mode test 33 indicate an operation in daily mode, the system carries out a test 40 to determine whether the current time corresponds to the beginning of an hour (this is identical to the test 34). If the answer is no, there is a simple updating 37 of the current time displayed, then the system is placed in the dormant state 38.

By contrast, if it is now the beginning of the one-hour period, the system makes a test 41 to find out if the current hour is a "limit hour" at which the second daily code should be substituted for the first daily code. Depending on the results of the test, the first code then will or will not be replaced (39) by the second code in the cyclical display, before the updating (37) of the current time displayed and the placing of the system in the dormant state (38).

FIG. 4 gives a schematic view of the structure of the COMPUTATION sub-program which prepares the secret codes and the code-changing periods on the basis of a secret algorithm.

When this COMPUTATION sub-program is called up, it first of all carries out a test 45 of the mode of operation of the system: hourly or daily.

Should it be the hourly operating mode, the secret computation is done on the basis of the following data:

a secret key, which is advantageously memorized in an EEPROM, during the manufacture or configuration of the box. Once stored in the EEPROM, this key is no longer accessible from the exterior, information on the current date, for example the year, month and day of the month;

a digital data element representing the area of validity of the card, for example a digital code of a city or town;

a digital code representing the current time;

The secret algorithm uses these input data elements to give a digital code (for example on 16 bytes) which will be used to determine:

the first secret code of the one-hour period in progress;

the second secret code of the one-hour period in progress;

the limit minute for changing from the first code to the second code in the one-hour period in progress.

It is seen that, with this process, the secret computation verifies the following conditions:

it is prepared from information coming from the box (secret key, date, time, algorithm) and information coming from the card (city or town code);

it is specific to each city or town (since it takes account of the city or town code);

it is specific to each day, and to each one-hour period, because both these parameters are taken into account equally.

Symmetrically, should the apparatus work in daily mode, the secret computation 47 works with the following at input:

the secret key;

the date (year, month, day of the month);

the city or town code.

At output, it gives the first daily code, the second daily code and the code-changing limit time.

FIG. 5 illustrates the working of the system during the insertion 50 of a valid card.

After insertion 50, the system requires the selection of a parking zone number, corresponding to a particular set of regulations governing parking in the city considered (namely, in the city that has issued the card inserted into the box). This selection period is shown schematically by the repetitive test 51.

When the choice of a zone has been made, the system calls up the secret computation program 52 (FIG. 4), and then updates the cyclical display according to the results of the computation and depending on whether or not the computed limit has been exceeded (53). It then goes into dormant mode 54 until an end-of-minute interruption or a withdrawal of the card.

As shown in FIG. 6, any withdrawal of the card 60 prompts an erasure 61 of the display and then an entry into the dormant state 62 until a new card is inserted into the box or until an end-of-minute interruption.

According to a preferred embodiment of the invention, the codes and the code-changing instant are each determined on eight bits and the codes are displayed in the form of hexadecimal numbers ranging from 00H to FFH. The remaining 13 bytes are not used.

In order to make the user responsible for the efficient functioning of his box, and to avoid the presence of complex circuits used to compensate for the frequency deviations of the quartz element used in the time base of the device of the invention, these deviations being due to high-temperature variations behind the windscreen of a vehicle, it proves to be advantageous to allow the user himself to set the current time and date on his box. These settings are done by means of two keys 15 and 16 (FIG. 1), which are pressed at the same time as a card is inserted into the box 10, either key being pressed to obtain a forward or backward adjustment of the year, month, day of the month, hour and minute.

This possibility would, however, enable an indiscrete user to gain advance knowledge of the codes and the code-changing times by advancing the time and/or date of his box. For example, if the parking payment cards of a city place the device in the mode where the code is changed every hour (two different codes every hour), it is enough to set the time of the box, for example at 2.59 p.m. for a certain day to gain knowledge of the code of this particular day at 2.59 p.m. and, in addition, after one minute, to gain knowledge of the code that will be displayed by the device from 3 p.m. onwards. Naturally, it will also be necessary to make a manual search, for example by means of a method of dichotomy, to know the exact code-changing instant which is between 3 p.m. and 4 p.m. To discourage the rise of such a practice, the invention proposes to avoid the display of a code immediately after the time has been set and after a card has been inserted. Thus, after a parking payment card has been inserted into the box, time-lagging means to set up a lag of some tens of seconds (for example 40s or even more than a minute) are activated and the code corresponding to the day and time memorized appear only at the end of the time-lagged period. Moreover, it is necessary to withdraw the card and re-insert it into the box in order to remodify the time. This is a painstaking operation and, furthermore, when the code appears, a parking credit unit is automatically debited from the card. In other words, such an attempt at fraud is costly. These various disadvantages and constraints are therefore aimed at discouraging any possible attempt at fraud, which becomes unprofitable notably in view of the amount of time needed to obtain the codes and the code-changing times.

Checks on validity of parking make it possible both to detect possible imitations and spurious versions through the display of the code and to ascertain that a vehicle has not infringed regulations by exceeding the parking time limit or by having used up all its fee units. To ascertain that the displayed code is truly the right one, the checker may be equipped with a reference box working, for example, without a payment card or with special cards. He may also compare the code displayed by a box with those of other vehicles that have already been checked. It is also possible to consider a use of special boxes. Another possibility lies in comparing the codes displayed by the boxes with the codes in a confidential list in the possession of each checker.

The present invention can naturally be applied also in time-accounting devices for regulated parking where the time cannot be modified by the user.

What is claimed is:

1. A time accounting system for regulating parking time comprising a plurality of boxes each including means for computing and having at least two secret codes, means for changing between the secret codes for all boxes simultaneously, so that the boxes can be checked for authenticity.

2. A system according to claim 1, wherein each of said boxes includes an independent integrated clock cooperating with said computing means to generate said codes at a given date and time.

3. A system according to claim 2, wherein said computing means determine two codes for one and the same day, the passage from one code to the other being done once a day at an hour and a minute that result from a secret computation.

4. A system according to claim 2, wherein said computing means determine two codes for each one-hour period, the changing from code to the other in the same one-hour period being done at a minute that results from a secret computation.

5. A system according to claim 1, wherein each box cooperates with an element containing consumable time units wherein said element comprises an information element that determines the period of time in which the changing of the code has to take place, said information element being modifiable.

6. A system according to claim 1, wherein each box cooperates with an element containing consumable time units, wherein said secret computation is done on the basis of at least one element of data coming from the box and at least one element of data coming from the element with consumable units.

7. A system according to claim 1, wherein said codes result from a computation that makes use of at least one information element belonging to the group comprising the current date, the current hour, a digital code characterizing the area of validity of the card inserted into the box, and a secret key.

8. A system according to claim 1, wherein said computation means generate said code-changing instant, one code preceding said code-changing instant and one code following said code-changing instant.

9. A system according to claim 1, wherein said box comprises means notably to display the current hour and/or said current code and/or the parking commencement time.

10. A system according to claim 1, wherein said box has means for being reset at the current time and time-lag means that systematically delay the display of the current code on said display means by several tens of seconds after a resetting at the current hour has been done, so as to discourage any attempt at fraud.

11. A system according to claim 9, wherein said current code appears on said display means in the form of a hexadecimal number encoded on two digits.

12. A system according to claim 5, wherein said codes and said code-changing instant are computed automatically at the commencement of the parking by the introduction of said element with consumable time units into said box.

13. A system according to claim 1, wherein said codes and said code-changing instant are computed automatically at the beginning of the each hour.

* * * * *